United States Patent
Xia et al.

(10) Patent No.: US 9,217,905 B2
(45) Date of Patent: Dec. 22, 2015

(54) DUAL-GATE DRIVEN LATERAL PIXEL ARRANGEMENT STRUCTURE AND DISPLAY PANEL

(71) Applicant: Shanghai AVIC Optoelectronics Co., Ltd., Shanghai (CN)

(72) Inventors: Zhiqiang Xia, Shanghai (CN); Chen Chen, Shanghai (CN); Zhongshou Huang, Shanghai (CN); Sisi Zhou, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 98 days.

(21) Appl. No.: 14/088,287

(22) Filed: Nov. 22, 2013

(65) Prior Publication Data

US 2014/0078032 A1    Mar. 20, 2014

Related U.S. Application Data

(63) Continuation-in-part of application No. PCT/CN2012/075993, filed on May 24, 2012.

(30) Foreign Application Priority Data

Aug. 12, 2011    (CN) .......................... 2011 1 0231785

(51) Int. Cl.
    *G09G 3/36*     (2006.01)
    *G02F 1/1362*   (2006.01)
(52) U.S. Cl.
    CPC ...... *G02F 1/136286* (2013.01); *G02F 1/13624* (2013.01); *G09G 3/3648* (2013.01); *G09G 2300/0426* (2013.01)

(58) Field of Classification Search
    CPC .......... G09G 3/354; G09G 2300/0439; G09G 2300/0443; G09G 2300/0452
    See application file for complete search history.

(56) References Cited

U.S. PATENT DOCUMENTS

2005/0041006 A1*    2/2005    Lee et al. .................... 345/99
2005/0046776 A1*    3/2005    Ahn et al. .................. 349/141

(Continued)

FOREIGN PATENT DOCUMENTS

| CN | 101004520 A | 7/2007 |
| CN | 1011221337 A | 7/2008 |

(Continued)

OTHER PUBLICATIONS

International Search Report as received in International Application PCT/CN2012/075993, dated Aug. 9, 2012.

*Primary Examiner* — Gene W Lee
(74) *Attorney, Agent, or Firm* — Alston & Bird LLP

(57) ABSTRACT

A dual-gate-driven lateral pixel arrangement structure includes two horizontally adjacent primary pixel regions having each three vertically adjacent secondary pixel regions forming a grid of six secondary pixel regions, and six thin-film transistors disposed in each of the six secondary pixel areas. The structure also includes two gate lines and three data lines crossing each other and electrically isolated from each other. Each data line is connected to the source of two thin-film transistors having the gate connected to a different gate line. The two gate lines are interposed between the three secondary pixel regions or arranged along a side or opposite sides of the primary pixel regions in a first direction. The three data lines are arranged between the primary pixel regions and along a side or opposite sides of the primary pixel regions in a second direction different from the first direction.

20 Claims, 7 Drawing Sheets

(56) References Cited

U.S. PATENT DOCUMENTS

| | | | |
|---|---|---|---|
| 2007/0091044 A1* | 4/2007 | Park | G09G 3/3648 345/88 |
| 2009/0140253 A1 | 6/2009 | Kasahara | |
| 2010/0085348 A1* | 4/2010 | Bae | G09G 3/3648 345/213 |
| 2011/0037746 A1* | 2/2011 | Kim | G09G 3/3611 345/211 |
| 2011/0156992 A1* | 6/2011 | Moon | G09G 3/3607 345/84 |
| 2012/0120035 A1* | 5/2012 | Yang et al. | 345/205 |

FOREIGN PATENT DOCUMENTS

| | | |
|---|---|---|
| CN | 101339315 A | 1/2009 |
| CN | 101625828 A | 1/2010 |
| CN | 101706633 A | 5/2010 |

\* cited by examiner

DUAL-GATE DRIVEN LATERAL PIXEL ARRANGEMENT STRUCTURE AND DISPLAY PANEL

CROSS-REFERENCES TO RELATED APPLICATIONS

This application claims priority to and is a continuation-in-part of PCT/CN2012/075993, filed on May 24, 2012 and entitled "DUAL-GATE-DRIVEN LATERAL PIXEL ARRANGEMENT STRUCTURE AND DISPLAY PANEL", which application claims the benefit of Chinese Patent Application No. 201110231785.X, filed with the Chinese Patent Office on Aug. 12, 2011, and entitled "DUAL-GATE-DRIVEN LATERAL PIXEL ARRANGEMENT STRUCTURE AND DISPLAY PANEL", the contents of which are incorporated herein by reference in their entirety.

FIELD OF THE INVENTION

The present invention relates to display technologies, and more particularly, to a dual-gate-driven lateral pixel arrangement structure and a display panel of using the same.

BACKGROUND OF THE INVENTION

In the prior art, three sub-pixel regions for display in red (R), green (G) and blue (B) are arranged from left to right in a primary pixel region of a display panel, each primary pixel region has a square or circular shape, each sub-pixel region has a rectangular shape that is defined by short sides and long sides. The short sides of each sub-pixel region are parallel to the gate lines, as shown in FIG. 1. The conventional display having a resolution of m×n includes m gate lines GATE1, GATE2, GATE3, ... GATEm−2, GATEm−1 and GATEm and 3n data lines D1, D2, D3, ... D3n−3, D3n−2, D3n−1 and D3n. Generally, such arrangement mode of sub-pixel regions is referred to as a vertical arrangement mode.

Depending on the driving modes, the pixel structure of a flat panel display may be a single-gate-driven pixel arrangement mode, a dual-gate-driven pixel arrangement mode and a tri-gate-driven pixel arrangement mode. In the single-gate-driven pixel arrangement mode, the three-color sub-pixel regions are driven together by a single gate driver; in the dual-gate-driven pixel arrangement mode, the three-color sub-pixel regions are driven together by two gate drivers; and in the tri-gate-driven pixel arrangement mode, the three-color sub-pixel regions are driven by three gate drivers.

Generally, in a 3D display, the right and left eyes of a person see different images, the raster grids provided in front of the display panel need to be arranged vertically, with the size of a raster grid being close to the size of a primary pixel region. Because of a positioning error between the glass plate on which the raster grids are provided and the display panel during assembly, the raster grids may block a certain colour, for example, a part of the area of the red sub-pixel region may be covered, thus causing a serious colour offset and chromatic aberration. In order to solve this problem, a lateral arrangement mode is proposed in the prior art, that is, various colour sub-pixel regions are arranged laterally. Thus, even if a positioning error occurs between the glass plate on which the raster grids are provided and the display panel during assembly, the same area of each of the three colour sub-pixel regions will be blocked; as a result, although the light transmitted by each sub-pixel region is decreased, the colour formed by the three sub-pixel regions is not offset. Currently, the lateral pixel arrangement mode may be one of a single-gate-driven lateral pixel arrangement mode in which a vertical screen is laterally utilized, a dual-gate-driven lateral pixel arrangement mode, or a tri-gate-driven lateral pixel arrangement mode.

The principle of the single-gate-driven lateral pixel arrangement mode in which a vertical screen is laterally-utilized is to rotate a screen with a resolution of m×n into a screen with a resolution of n×m. In such an arrangement mode, a buffer needs to be added to the driving circuit for the lateral-to-vertical conversion of a display signal, but this will greatly increase the system costs. Therefore, such an arrangement mode is rarely applied.

Comparing the single-gate-driven lateral pixel arrangement mode in which a vertical screen is laterally utilized to the tri-gate-driven lateral pixel arrangement mode, the number of the gate lines is three times of that of the single-gate-driven lateral pixel arrangement mode in which a vertical screen is laterally utilized, but the number of the data lines thereof is one-third of that of the single-gate-driven lateral pixel arrangement mode in which a vertical screen is laterally utilized, thus a display panel employing the tri-gate-driven lateral pixel arrangement mode uses more gate driving chips, but less source driving chips. Because the number of the gate lines is three times that of single-gate-driven lateral pixel arrangement mode in which a vertical screen is laterally utilized, and the driving time of each gate line is shortened to one-third of that of single-gate-driven lateral pixel arrangement mode in which a vertical screen is laterally utilized; in the case of a high resolution display, it is difficult for the manufacturing process of conventional thin film transistors (TFTs) to meet the driving requirements.

BRIEF SUMMARY OF THE INVENTION

In view of the foregoing, embodiments of the present invention provide a dual-gate-driven lateral pixel arrangement structure and a display panel of using the same.

Embodiments of the invention provide a dual-gate-driven lateral pixel arrangement structure including a first primary pixel region and a second primary pixel region. The first and second primary pixel regions are arranged horizontally and adjacent to each other. The primary pixel regions each have three vertically adjacent secondary pixel regions, forming a grid of six secondary pixel regions arranged in three rows and two columns.

The structure also includes six thin film transistors, each is disposed in one of the six secondary pixel regions, two gate lines and three data lines. Each data line is electrically connected to the source electrodes of two thin film transistors, and the thin film transistors electrically connected to any one of the data lines are different from those electrically connected to the other data lines, and the gates of two thin film transistors electrically connected to the same data line are electrically connected to a different gate line.

In an embodiment, each of the secondary pixel regions has a rectangular shape having long sides parallel with the gate lines and short sides parallel with the data lines. In an embodiment, the gate lines are interposed between the three rows (the three vertically adjacent secondary pixel regions). In another embodiment, one of the gate lines is arranged between two vertically adjacent secondary pixel regions and the other gate line is arranged along a side of the two horizontally adjacent primary pixel regions. In yet another embodiment, the two gate lines are arranged along opposite sides of the two horizontally adjacent primary pixel regions.

In an embodiment, one, two, or three of the data lines are arranged between the two horizontal and adjacent primary pixel regions. In another embodiment, the two primary pixel regions are interposed between the three data lines. In yet another embodiment, two of the data lines are arranged between the two primary pixel regions and the third one is arranged along an external side of the two primary pixel regions.

In an embodiment, a display panel includes a first substrate, a second substrate, a plurality of pixel units arranged on the first substrate, and a liquid crystal layer disposed between the first substrate and the second substrate. Each of the pixel units may include the dual-gate-driven lateral pixel arrangement structure described above. In an embodiment, the display panel has n×m pixel elements that can be driven by 2m gate lines and 3n/2 data lines.

An embodiment of the present invention provides a method for driving a dual-gate-driven lateral pixel arrangement structure having two primary pixel regions arranged horizontally and adjacent to each other, each primary pixel region has three secondary pixel regions that are arranged vertically and adjacent to each other to form a grid of six thin film transistors, six thin film transistors, a first gate line and a second gate line each connected to the gate of three different thin film transistors, three data lines each connected to the source of two different thin film transistors. The method includes, at a first time point, driving the first gate line at a high level and the second gate line at a low level to turn on a thin film transistor electrically connected to the first gate line; and providing first appropriate signal levels to the three data lines.

The method also includes, at a second time point, driving the second gate line at a high level and the first gate line at a low level to turn on a thin film transistor electrically connected to the second gate line; and providing second appropriate signal levels to the three data lines.

The dual-gate-driven lateral pixel arrangement structure according to embodiments of the present invention may be such a dual-gate-driven lateral pixel arrangement structure, where each data line is electrically connected to the source electrode of two thin film transistors, and the gate of these two thin film transistors electrically connected to the same data line is electrically connected to a different gate line. With such a pixel structure, only 2m gate lines and 3n/2 data lines are needed for a screen with a resolution of m×n; thus, the driving time of each gate line can be shortened to one-half of that of single-gate-driven lateral pixel arrangement mode in which a vertical screen is laterally utilized, so that manufacturing processes of a conventional TFT may also meet the driving requirements for a high resolution display panel.

BRIEF DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art.

DETAILED DESCRIPTION OF THE INVENTION

Figure 1:
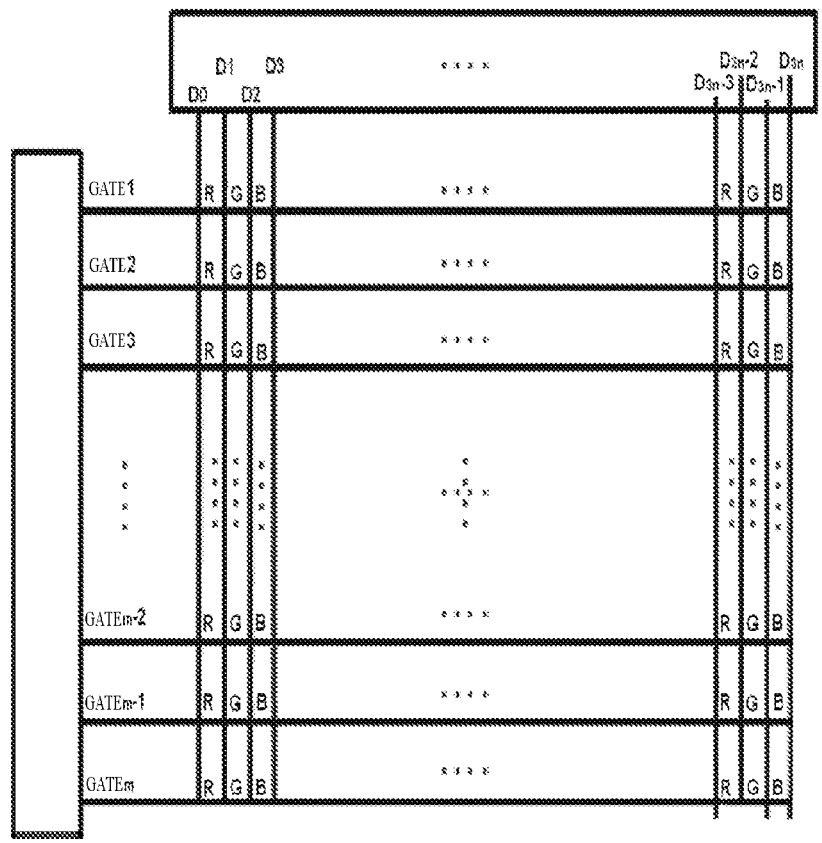
FIG. 1 is a schematic diagram of the vertical arrangement of pixels in the prior art.

Embodiments of the present invention will be described fully below in conjunction with the accompanying drawings. Those of ordinary skill in the art will appreciate that the following description of the present invention is illustrative only and not in any way limiting. Other embodiments of the invention will readily suggest themselves to a person of ordinary skill in the art after a perusal of this disclosure.

One embodiment of the invention provides a dual-gate-driven lateral pixel arrangement structure including a plurality of pixel units. Each of the pixel units may include a first gate line and a second gate line, and three data lines (a first data line, a second data line and a third data line) that are arranged in sequence. In an embodiment, the two gate lines are disposed on a substrate and arranged in parallel along a first direction, and the three data lines are disposed on the substrate and arranged in parallel along a second direction. The two gate lines cross the three data lines and are electrically isolated from the three data lines. In one specific embodiment, the first direction is perpendicular to the second direction. In other words, the gate lines are orthogonal to the data lines.

Each pixel unit further includes two primary pixel regions that are arranged horizontally and adjacent to each other. Each of the primary pixel regions includes three vertically adjacent secondary pixel regions that are used for displaying red (R), green (G) and blue (B). In other words, the two primary pixel regions form a grid of three rows and two columns having a total of six secondary pixel regions. In an embodiment, the secondary pixel region has a rectangular shape having the long sides parallel with the first direction and the short sides parallel with the second direction.

Each pixel unit further includes six thin film transistors, each disposed in one of the six secondary pixel regions, and each thin film transistor includes a source electrode, a drain electrode and a gate electrode.

In an embodiment, each data line is electrically connected to the source electrode of two thin film transistors, so that the three data lines are electrically connected to the source electrode of the six thin film transistors. In an embodiment, the thin film transistors electrically connected to any one of the three data lines are different from those electrically connected to another one of the three data lines, that is, the thin film transistors electrically connected to the first data line are different from the thin film transistors electrically connected to the second data line and the thin film transistors electrically connected to the third data line, thus the three data lines are electrically connected to the source electrode of the six thin film transistors; the gate of two thin film transistors electrically connected to the same data line are electrically connected to a different gate line.

The above described pixel structure of the pixel unit may further include a pixel electrode and a common electrode line that is partially overlapped with the pixel electrode to form a storage capacitor, the pixel electrode covers the light transmission region of a corresponding secondary pixel region, and each pixel electrode is electrically connected to the drain electrode of the corresponding thin film transistor. In an embodiment, there may be two common electrode lines, i.e., a first common electrode line and a second common electrode line, the pixel electrodes covering the secondary pixel region in the first primary pixel region overlap with the first common electrode line to form three storage capacitors; the pixel electrodes covering the pixel electrode on the secondary pixel region in the second primary pixel region overlap with the second common electrode line to form three storage capacitors. In other words, the first common electrode line and the second common electrode line are parallel with the data line, and two common electrode lines form six storage capacitors. In another embodiment, there may be three common electrode lines, i.e., a first common electrode line, a second common electrode line and a third common electrode line, these three common electrode lines each are parallel with the gate lines, and each common electrode line overlaps with a pixel electrode of one secondary pixel region in each of the first and second primary pixel regions to form a storage capacitor, that is, each common electrode line overlaps with the pixel electrodes of two different primary pixel regions to form two storage capacitors, and hence three common electrode lines are used to form six storage capacitors.

A dual-gate-driven lateral pixel structure according to an embodiment of the invention may be such a dual-gate-driven lateral pixel arrangement structure, where each data line is electrically connected to the source electrodes of two thin film transistors, and the gates of two thin film transistors electrically connected to the same data line are electrically connected to different gate lines. With such a pixel structure, 2m gate lines and 3n/2 data lines are needed for a screen with a resolution of m×n, wherein n denotes a horizontal resolution and m denotes a vertical resolution; thus, the driving time of each gate line is shortened to one-half of that of single-gate-driven lateral pixel arrangement mode in which a vertical screen is laterally utilized, so that a conventional TFT may also meet the driving requirements for at high resolution, and thus is acceptable for extensive use. Moreover, the gate lines and the data lines required by the pixel structure according to the embodiment of the invention are the same as those required by the existing dual-gate-driven vertical pixel arrangement mode, thus the number of the source driving chips and the gate driving chips may remain unchanged, the driving time and the driving mode of each gate line may also remain unchanged, and the size of the display panel may also remain unchanged. Therefore, the dual-gate-driven lateral pixel arrangement structure according to the embodiment of the invention may be manufactured by using the manufacturing processes of the existing dual-gate-driven vertical pixel arrangement structure.

Figure 2:
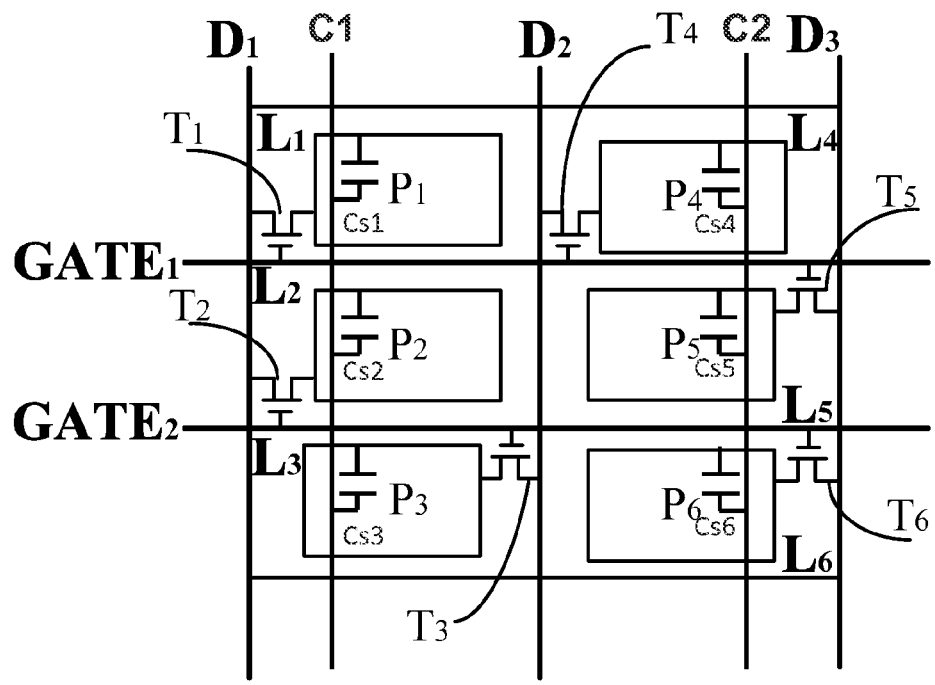
FIG. 2 is a schematic diagram of a dual-gate-driven lateral pixel arrangement structure according to an embodiment of the invention.

One embodiment of the invention provides a dual-gate-driven lateral pixel arrangement structure. FIG. 2 shows an example schematic diagram of a dual-gate driven lateral pixel arrangement structure according to an embodiment of the present invention. In an embodiment, a display panel may include a plurality of pixel units, each pixel unit may include: two gate lines (i.e., a first gate line GATE1 and a second gate line GATE2), which are arranged on a substrate in parallel along a first direction; three data lines (i.e., a first data line D1, a second data line D2 and a third data line D3) that are sequentially arranged, and the three data lines are arranged on the substrate in parallel along a second direction which is perpendicular to the first direction.

The pixel unit also includes two primary pixel regions (i.e., a first primary pixel region and a second primary pixel region), the first primary pixel region includes a first secondary pixel region L1, a second secondary pixel region L2 and a third secondary pixel region L3; and the second primary pixel region includes a fourth secondary pixel region L4, a fifth secondary pixel region L5 and a sixth secondary pixel region L6. The light transmission regions of the first secondary pixel region L1, the second secondary pixel region L2, the third secondary pixel region L3, the fourth secondary pixel region L4, the fifth secondary pixel region L5 and the sixth secondary pixel region L6 are denoted by P1, P2, P3, P4, P5 and P6, respectively. In an embodiment, each secondary pixel region has a rectangular shape having short sides and long sides. The long sides of the secondary pixel region are substantially parallel with the first direction, and the short sides of the secondary pixel region are substantially parallel with the second direction. In an embodiment, the two primary pixel regions may include two red secondary pixel regions, two green secondary pixel regions and two blue secondary pixel regions, which may be combined in various manners. Further, there may be other permutations and combinations of colour secondary pixel regions in the two primary pixel regions;

The pixel unit also includes six thin film transistors, each is disposed in one of the six secondary pixel regions, that is, one thin film transistor per secondary pixel region. For example, a thin film transistor T1 is disposed in a first secondary pixel region, a thin film transistor T2 is disposed in a second secondary pixel region, a thin film transistor T3 is disposed in a third secondary pixel region, a thin film transistor T4 is disposed in a fourth secondary pixel region, a thin film transistor T5 is disposed in a fifth secondary pixel region and a thin film transistor T6 is disposed in a sixth secondary pixel region. Each thin film transistor includes a source electrode, a drain electrode and a gate electrode.

The pixel unit also includes six pixel electrodes (not shown), each of which covers the light transmission region of the corresponding secondary pixel region and is electrically connected to the drain electrode of the corresponding thin film transistor.

The pixel unit also includes two common electrode lines, (i.e., a first common electrode line C1 and a second common electrode line C2), wherein the pixel electrodes electrically connected to the drain electrodes of the transistors T1, T2 and T3 (i.e., the pixel electrodes covering the secondary pixel regions L1, L2 and L3) respectively overlap with the first common electrode line and form three storage capacitors Cs1, Cs2, and Cs3; and the pixel electrodes electrically connected to the drain electrodes of the transistors T4, T5 and T6 (i.e., the pixel electrodes covering the secondary pixel regions L4, L5 and L6) respectively overlap with the second common electrode line and form three storage capacitors Cs4, Cs5, and Cs6, with the first common electrode line and the second common electrode line being respectively parallel with the data lines.

Referring to FIG. 2, in an embodiment, the first primary pixel region lies between the first data line D1 and the second data line D2; the second primary pixel region lies between the second data line D2 and the third data line D3; the two gate lines cross the three data lines to form a first enclosed region and a second enclosed region. Note that the gate lines are electrically isolated for the data lines. The second secondary pixel region L2 and the fifth secondary pixel region L5 lie in the first enclosed region and the second enclosed region, respectively.

The first data line D1 is electrically connected to the source electrodes of the thin film transistors T1 and T2; the gate of the thin film transistor T1 is electrically connected to the first gate line GATE1; the gate of the thin film transistor T2 is electrically connected to the second gate line GATE2; the second data line D2 is electrically connected to the source electrodes of the thin film transistors T3 and T4; the gate of the thin film transistor T3 is electrically connected to the second gate line GATE2; the gate of the thin film transistor T4 is electrically connected to the first gate line GATE1; the third data line D3 is electrically connected to the source electrodes of the thin film transistors T5 and T6; the gate of the thin film transistor T5 is electrically connected to the first gate line GATE1; and the gate of the thin film transistor T6 is electrically connected to the second gate line GATE2.

It should be noted that, the secondary pixel region may have a rectangular shape including first sides and second sides; the first gate line GATE1 and the second gate line GATE2 are parallel with the first sides of the secondary pixel region, and are respectively arranged between the three secondary pixel regions in each primary pixel region, or arranged outside of each secondary pixel region. The first data line D1, the second data line D2 and the third data line D3 are parallel with the second sides of the secondary pixel region and are respectively arranged between two primary pixel regions of the pixel unit or arranged outside of the two primary pixel regions. In a preferred embodiment, the first sides are the long sides of the rectangular shape, and the second sides are the short sides of the rectangular shape. In another embodiment, the first sides are the short sides of the rectangular shape, and the second sides are the long sides of the rectangular shape. Hereinafter, for specific arrangement modes of the two gate lines and the three data lines, reference may be made to the detailed description in connection with FIGS. 7 to 13.

In some embodiments of the present invention, two primary pixel regions may form a pixel unit that can be repeated vertically and transversally on a substrate, and each primary pixel region includes three secondary pixel regions (which, in a preferred combination, are a red secondary pixel region R, a green secondary pixel region G and a blue secondary pixel region B), that is, the minimum repeatable pixel unit includes 6 secondary pixel regions that can be arranged in a side-by-side manner. The minimum repeatable pixel unit includes two gate lines, three data lines and six thin film transistors, here, each data line drives two secondary pixel regions, which are controlled by different gate lines, respectively. With such a pixel structure, 2m gate lines are needed and 3n/2 data lines are needed for a screen with a resolution of m×n; thus, the driving time of each gate line is shortened to one-half of that in the single-gate-driven lateral pixel arrangement mode in which a vertical screen is laterally utilized, so that an ordinary TFT may also meet the driving requirements for achieving a relatively high resolution, and hence may be acceptable for extensive use. Moreover, the gate lines and the data lines required by the pixel structure according to the embodiment of the invention are the same as those required by the existing dual-gate-driven vertical pixel arrangement mode, thus the number of the source driving chips and the gate driving chips remains unchanged, the driving time and the driving mode of each gate line may also remain unchanged, and the size of the display panel may also remain unchanged. Therefore, the dual-gate-driven lateral pixel arrangement structure according to embodiments of the invention may be manufactured by using manufacturing processes of the existing dual-gate-driven vertical pixel arrangement structure, and the dual-gate-driven lateral pixel arrangement structure according to embodiments of the invention may be more applicable for manufacturing of a 3D display.

A method for driving a dual-gate-driven lateral pixel arrangement structure is described below, which is applicable for the above dual-gate-driven lateral pixel arrangement structure. In an embodiment, the method includes that: at a first time point, driving the first gate line of the two gate lines at a high level and the second gate line of the two gate lines at a low level to turn on a thin film transistor that is electrically connected to the first gate line, and applying a first appropriate signal levels to the three data lines that are electrically connected to the thin film transistors.

the method further includes, at a second time point, driving the second gate line at a high level and the first gate line at a low level to turn on a thin film transistor that is electrically connected to the second gate line, and applying second appropriate signal levels to the three data lines.

That is, in the case of the dual-gate-driven lateral pixel arrangement structure shown in FIG. 2, at a time point t1, the gate line GATE1 is at a high level, and the thin film transistors T1, T4 and T5 are turned on simultaneously; at this point, the data line D1 delivers data to the secondary pixel region L1, the data line D2 delivers data to the secondary pixel region L4, and the data line D3 delivers data to the secondary pixel region L5. Then, at a time point t2, the gate line GATE1 is changed to a low level, the gate line GATE2 is at a high level, the thin film transistors T1, T4 and T5 are turned off concurrently, the thin film transistors T2, T3 and T6 are turned on concurrently, the data line D1 delivers data to the secondary pixel region L2, the data line D2 delivers data to the secondary pixel region L3, and the data line D3 delivers data to the secondary pixel region L6. Thus, the driving of one pixel unit is realized.

Figure 3:
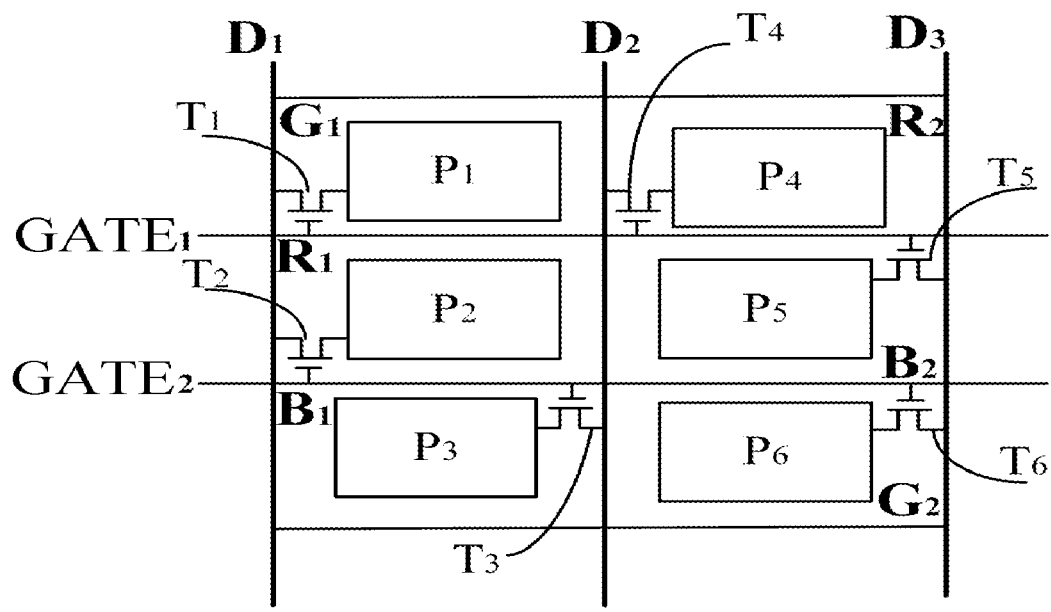
FIG. 3 is a specific schematic diagram of the pixel structure based on that of FIG. 2 according to an embodiment of the invention.

The method for monochrome display driving will be described below by taking a TN-LCD normally white mode as an example. Referring to FIG. 3, assume that the first pixel region L1 is a green secondary pixel region G1, the second pixel region L2 is a red secondary pixel region R1, the third pixel region L3 is a blue secondary pixel region B1, the fourth pixel region L4 is a red secondary pixel region R2, the fifth pixel region L5 is a blue secondary pixel region B2, and the sixth pixel region L6 is a green secondary pixel region G2. The data line provides a pixel voltage S, the secondary pixel region is in a dark state when the pixel voltage S is at a positive or negative high level relative to a reference voltage COM; and the secondary pixel region is in a bright state when the pixel voltage S is at a positive or negative low level relative to the reference voltage COM; where, the pixel voltage S is the level of the data delivered by the data line to the thin film transistor, and when the pixel voltage S is at a positive or negative low level relative to the reference voltage COM, it means that the pixel voltage S is close to the reference voltage COM.

A method for red display driving, which is applicable for the above pixel structure, will be described below.

Figure 4:
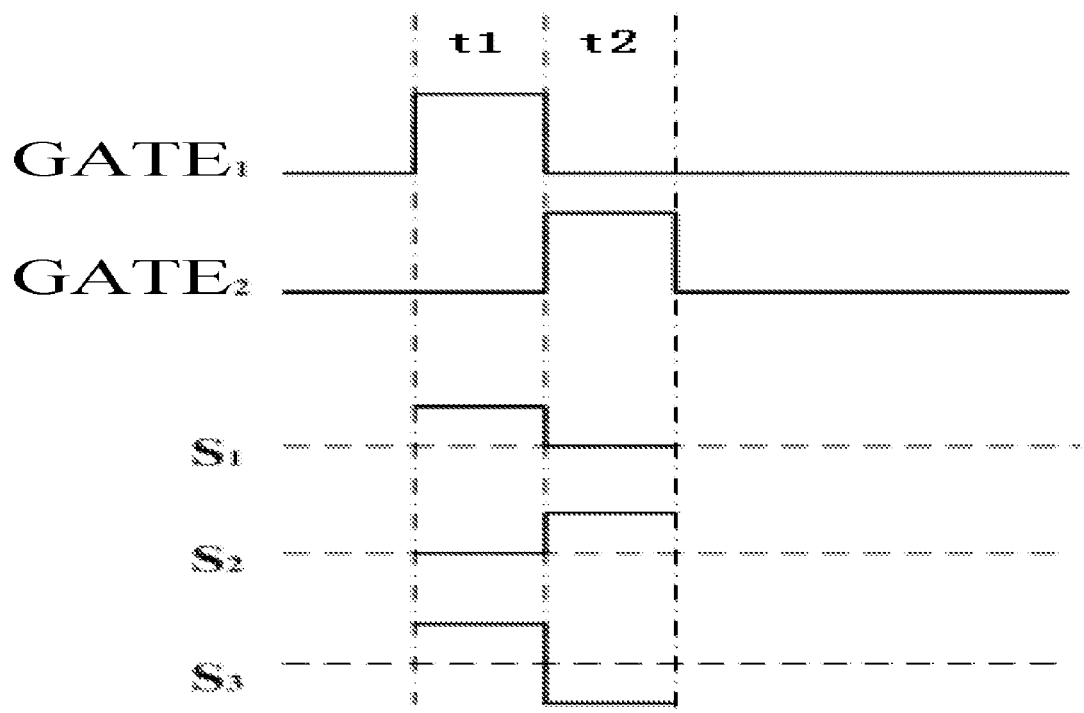
FIG. 4 is a schematic diagram of a driving mode for a dual-gate-driven lateral pixel arrangement structure according to an embodiment of the invention.

Referring to FIG. 4, at a time point t1, the gate line (i.e. a scan line) GATE1 is at a high level, and the other scan lines are at a low level, thin film transistors of the secondary pixel regions G1, R2 and B2 are turned on, and levels S1, S2 and S3 are used for delivering data to the secondary pixel regions G1, R2 and B2, respectively. In the following figures, S1, S2 and S3 denote respectively the levels of the data delivered by data lines D1, D2 and D3 (also referred to as pixel voltages). Assume that the level S1 is at a positive high level, the level S2 is at a negative low level, and the level S3 is at a positive high level, thus the secondary pixel region G1 is dark, the secondary pixel region R2 is bright, and the secondary pixel region B2 is dark. At a time point t2, the gate line (i.e. a scan line) GATE2 is at a high level, and the other scan lines are at a low level, the transistors of the secondary pixel regions R1, B1 and G2 are turned on, and levels S1, S2 and S3 are respectively used for delivering data to the secondary pixel regions R1, B1 and G2, the level S1 is at a negative low level, the level S2 is at a positive high level, the level S3 is at a negative high level, thus the secondary pixel region R1 is bright, the secondary pixel region B1 is dark, and the secondary pixel region G2 is dark. Thus, in one repeated unit, only the red secondary pixel is bright, and all other secondary pixels are dark; at the next time point, the signal at each data line in the two primary pixels repeats the waveforms at the time points t1 and t2, so that the whole repeated unit always displays in red.

Figure 5:
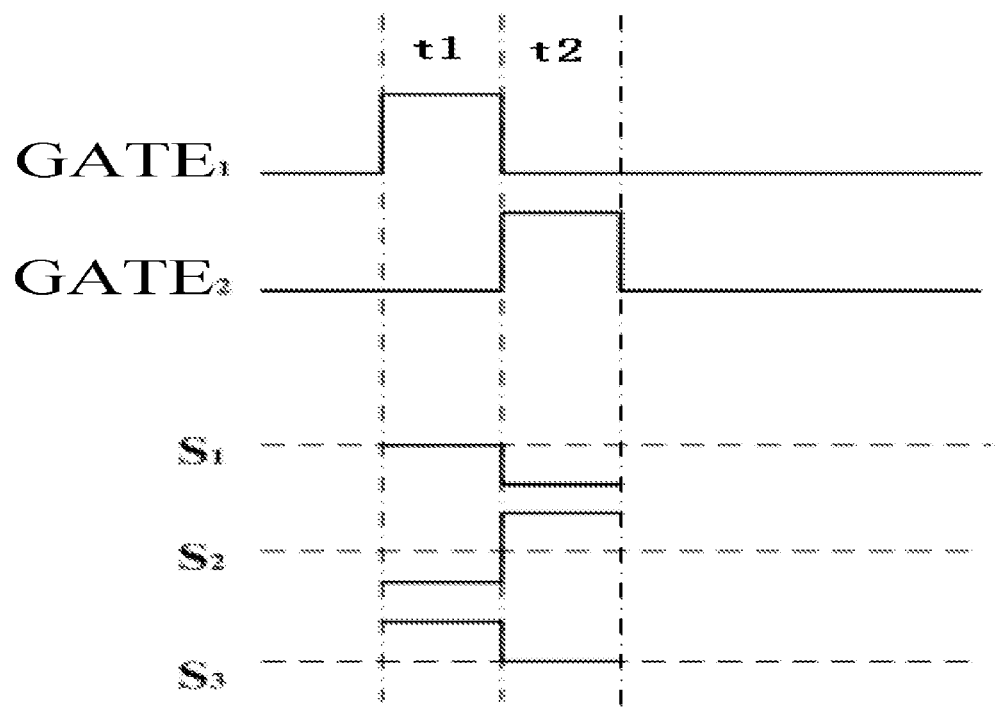
FIG. 5 is a schematic diagram of another driving mode for a dual-gate-driven lateral pixel arrangement structure according to an embodiment of the invention.

A method for green display driving, which is applicable for the above pixel structure, will be described below:

As shown in FIG. 5, at a time point t1, the gate line (i.e. a scan line) GATE1 is at a high level, and the other scan lines are at a low level, thin film transistors of the secondary pixel regions G1, R2 and B2 are turned on, and levels S1, S2 and S3 are used for delivering data to the secondary pixel regions G1, R2 and B2, respectively. The level S1 is at a positive low level, the level S2 is at a negative high level, and the level S3 is at a positive high level, thus the secondary pixel region G1 is bright, the secondary pixel region R2 is dark, and the secondary pixel region B2 is dark. At a time point t2, the gate line (i.e. a scan line) GATE2 is at a high level, and the other scan lines are at a low level, the transistors of the secondary pixel regions R1, B1 and G2 are turned on, and levels S1, S2 and S3 are respectively used for delivering data to the secondary pixel regions R1, B1 and G2, the level S1 is at a negative high level, the level S2 is at a positive high level, the level S3 is at a negative low level, thus the secondary pixel region R1 is dark, the secondary pixel region B1 is dark, and the secondary pixel region G2 is bright. Thus, in one repeated unit, only the green secondary pixel is bright, and all other secondary pixels are dark; at the next time point, the signal at each data line in the two primary pixels repeats the waveforms at the time points t1 and t2, so that the whole repeated unit always displays in green.

A method for blue display driving, which is applicable for the above pixel structure, will be described below.

Figure 6:
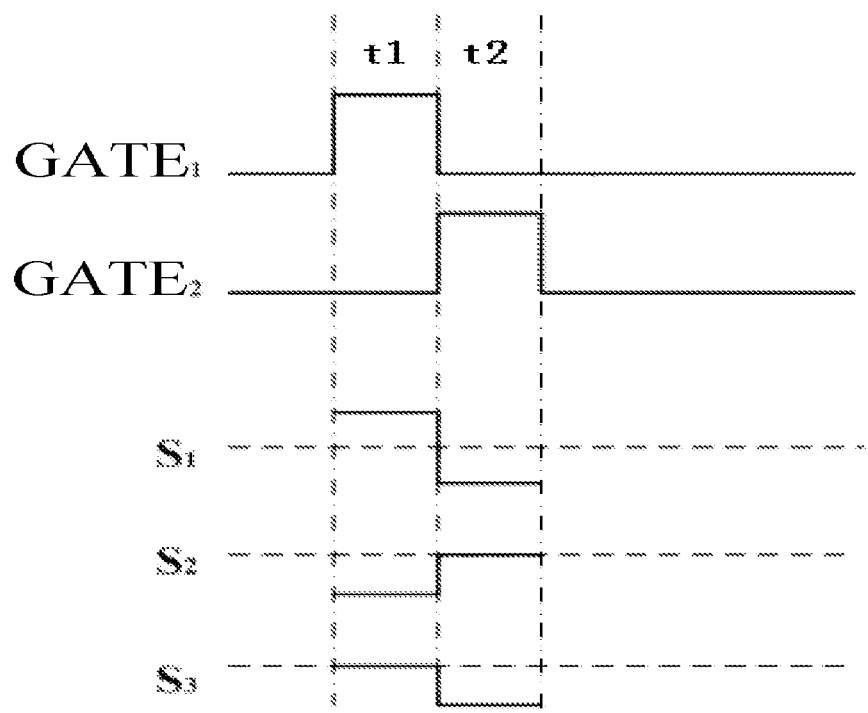
FIG. 6 is a schematic diagram of yet another driving mode for a dual-gate-driven lateral pixel arrangement structure according to an embodiment of the invention.

As shown in FIG. 6, at a time point t1, the gate line (i.e. a scan line) GATE1 is at a high level, and the other scan lines are at a low level, thin film transistors of the secondary pixel regions G1, R2 and B2 are turned on, and levels S1, S2 and S3 are used for delivering data to the secondary pixel regions G1, R2 and B2, respectively. The level S1 is at a positive high level, the level S2 is at a negative high level, and the level S3 is at a positive low level, thus the secondary pixel region G1 is dark, the secondary pixel region R2 is dark, and the secondary pixel region B2 is bright. At a time point t2, the gate line (i.e. a scan line) GATE2 is at a high level, and the other scan lines are at a low level, the transistors of the secondary pixel regions R1, B1 and G2 are turned on, and levels S1, S2 and S3 are respectively used for delivering data to the secondary pixel regions R1, B1 and G2, the level S1 is at a negative high level, the level S2 is at a positive low level, the level S3 is at a negative high level, thus the secondary pixel region R1 is dark, the secondary pixel region B1 is bright, and the secondary pixel region G2 is dark. Thus, in one repeated unit, only the blue secondary pixel is bright, and all other secondary pixels are dark; at the next time point, the signal at each data line in the two primary pixels repeats the waveforms at the time points t1 and t2, so that the whole repeated unit always displays in blue.

The above driving method may be used to independently control the colour and brightness of each secondary pixel region for displaying in red, green or blue, and thus can be used for driving the dual-gate-driven lateral pixel arrangement structure according to the embodiment of the invention, so that the whole screen may be controlled to display the colour and pattern required by a user.

Figure 7:
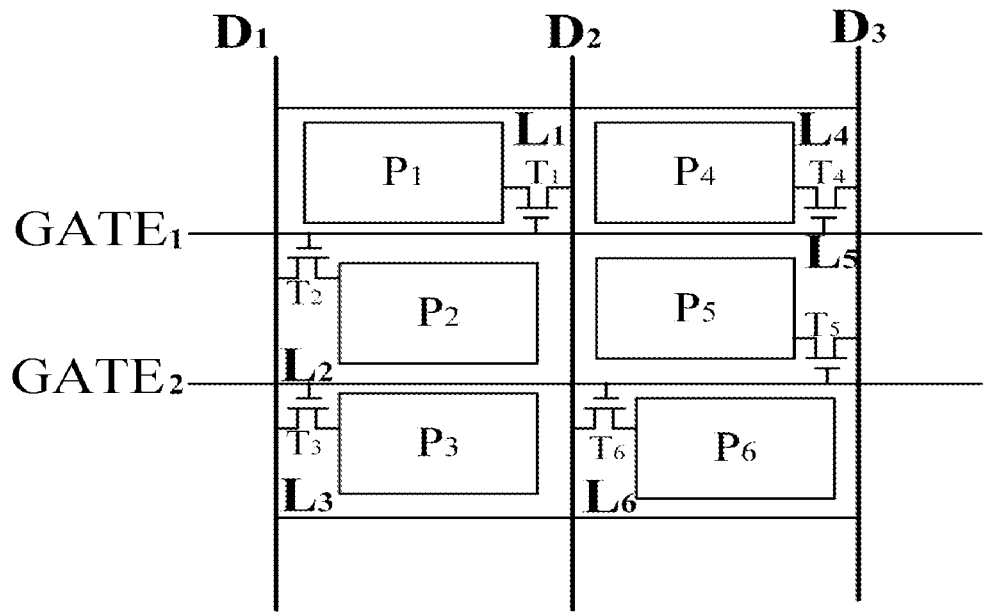
FIG. 7 is a schematic diagram of another dual-gate-driven lateral pixel arrangement structure according to an embodiment of the invention.

FIG. 7 shows a dual-gate-driven lateral pixel arrangement structure according to one embodiment of the invention, which is different from the embodiment shown in FIG. 2 in that: the first data line D1 is electrically connected to the source electrodes of the thin film transistors T2 and T3; the gate of the thin film transistor T2 is electrically connected to the first gate line GATE1; the gate of the thin film transistor T3 is electrically connected to the second gate line GATE2; the second data line D2 is electrically connected to the source electrodes of the thin film transistors T1 and T6; the gate of thin film transistor T1 is electrically connected to the first gate line GATE1; the gate of the thin film transistor T6 is electrically connected to the second gate line GATE2; the third data line D3 is electrically connected to the source electrodes of the thin film transistors T4 and T5; the gate of the thin film transistor T4 is electrically connected to the first gate line GATE1; the gate of the thin film transistor T5 is electrically connected to the second gate line GATE2.

Figure 8:
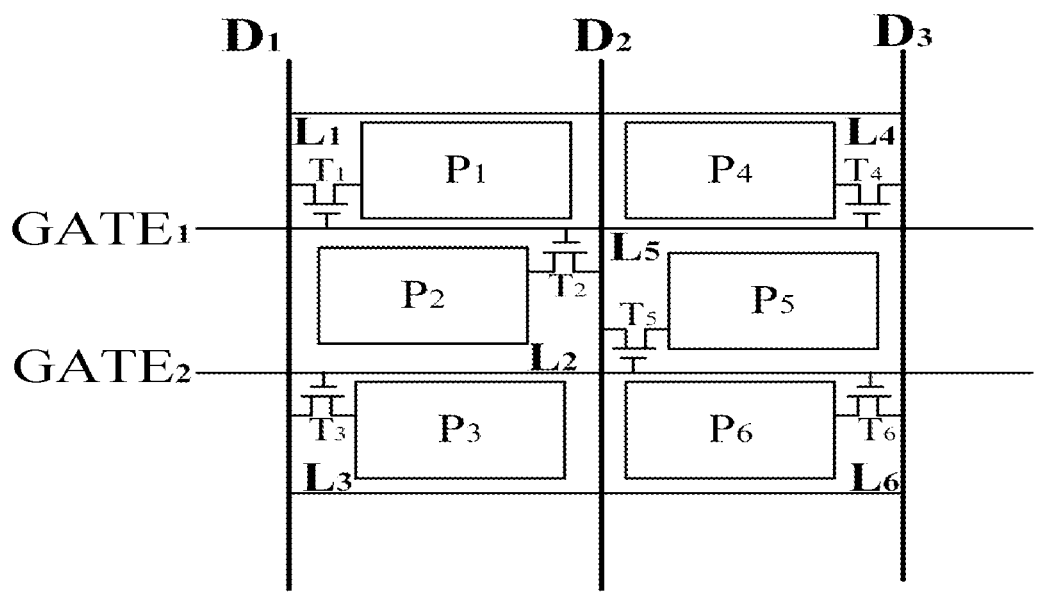
FIG. 8 is a schematic diagram of another dual-gate-driven lateral pixel arrangement structure according to an embodiment of the invention.

FIG. 8 shows another dual-gate-driven lateral pixel arrangement structure according to one embodiment of the invention, which is different from the embodiment shown in FIG. 2 in that: the first data line D1 is electrically connected to the source electrodes of the thin film transistors T1 and T3; the gate of thin film transistor T1 is electrically connected to the first gate line GATE1; the gate of the thin film transistor T3 is electrically connected to the second gate line GATE2; the second data line D2 is electrically connected to the source electrodes of the thin film transistors T2 and T5; the gate of the thin film transistor T2 is electrically connected to the first gate line GATE1; the gate of the thin film transistor T5 is electrically connected to the second gate line GATE2; the third data line D3 is electrically connected to the source electrodes of the thin film transistors T4 and T6; the gate of the thin film transistor T4 is electrically connected to the first gate line GATE1; and the gate of the thin film transistor T6 is electrically connected to the second gate line GATE2.

Figure 9:
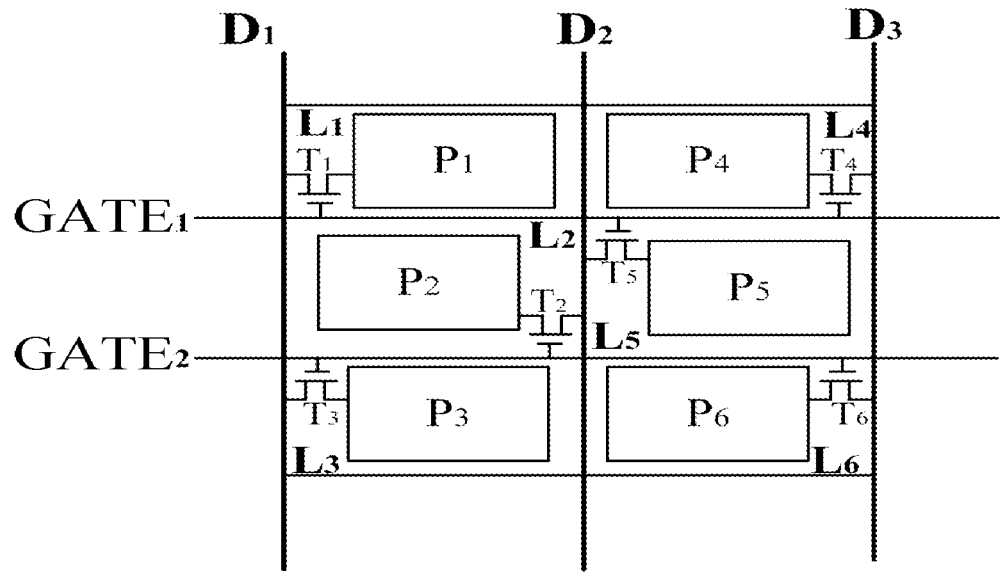
FIG. 9 is a schematic diagram of another dual-gate-driven lateral pixel arrangement structure according to an embodiment of the invention.

FIG. 9 shows another dual-gate-driven lateral pixel arrangement structure according to one embodiment of the invention, which is different from the embodiment shown in FIG. 2 in that: the first data line D1 is electrically connected to the source electrodes of the thin film transistors T1 and T3; the gate of thin film transistor T1 is electrically connected to the first gate line GATE1; the gate of the thin film transistor T3 is electrically connected to the second gate line GATE2; the second data line D2 is electrically connected to the source electrodes of the thin film transistors T2 and T5; the gate of the thin film transistor T5 is electrically connected to the first gate line GATE1; the gate of the thin film transistor T2 is electrically connected to the second gate line GATE2; the third data line D3 is electrically connected to the source electrodes of the thin film transistors T4 and T6; the gate of the thin film transistor T4 is electrically connected to the first gate line GATE1; and the gate of the thin film transistor T6 is electrically connected to the second gate line GATE2.

Figure 10:
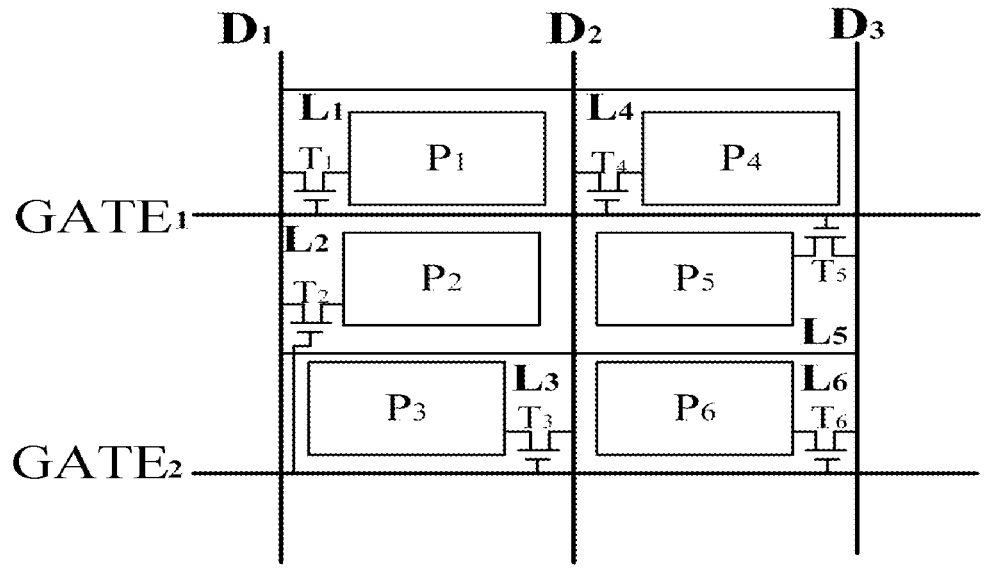
FIG. 10 is a schematic diagram of another dual-gate-driven lateral pixel arrangement structure according to an embodiment of the invention.

FIG. 10 shows another dual-gate-driven lateral pixel arrangement structure according to one embodiment of the invention, which is different from the embodiment shown in FIG. 2 in that: the first primary pixel region lies between the first and second data lines; the second primary pixel region lies between the second and third data lines; the two gate lines and the three data lines cross to form a first enclosed region and a second enclosed region; the second secondary pixel region L2 and the third secondary pixel region L3 lie in the first enclosed region, and the fifth secondary pixel region L5 and the sixth secondary pixel region L6 lie in the second enclosed region. Specifically, the first data line D1 is electrically connected to the source electrodes of the thin film transistors T1 and T2; the gate of thin film transistor T1 is electrically connected to the first gate line GATE1; the gate of the thin film transistor T2 is electrically connected to the second gate line GATE2; the second data line D2 is electrically connected to the source electrodes of the thin film transistors T3 and T4; the gate of the thin film transistor T3 is electrically connected to the second gate line GATE2; the gate of the thin film transistor T4 is electrically connected to the first gate line GATE1; the third data line D3 is electrically connected to the source electrodes of the thin film transistors T5 and T6; the gate of the thin film transistor T5 is electrically connected to the first gate line GATE1; and the gate of the thin film transistor T6 is electrically connected to the second gate line GATE2.

Figure 11:
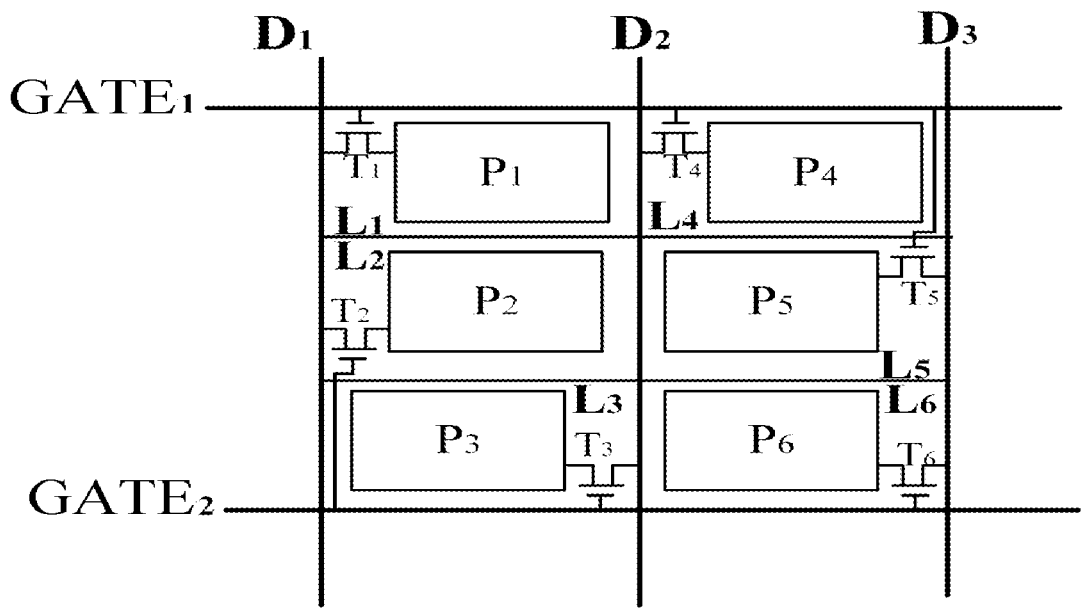
FIG. 11 is a schematic diagram of another dual-gate-driven lateral pixel arrangement structure according to an embodiment of the invention.

FIG. 11 shows another dual-gate-driven lateral pixel arrangement structure according to one embodiment of the invention, which is different from the embodiment shown in FIG. 2 in that: the first primary pixel region lies between the first and second data lines; the second primary pixel region lies between the second and third data lines; the two gate lines and the three data lines cross to form a first enclosed region and a second enclosed region; the first secondary pixel region L1, the second secondary pixel region L2 and the third secondary pixel region L3 lie in the first enclosed region, and the fourth secondary pixel region L4, the fifth secondary pixel region L5 and the sixth secondary pixel region L6 lie in the second enclosed region. Specifically, the first data line D1 is electrically connected to the source electrodes of the thin film transistors T1 and T2; the gate of thin film transistor T1 is electrically connected to the first gate line GATE1; the gate of the thin film transistor T2 is electrically connected to the second gate line GATE2; the second data line D2 is electrically connected to the source electrodes of the thin film transistors T3 and T4; the gate of the thin film transistor T4 is electrically connected to the first gate line GATE1; the gate of the thin film transistor T3 is electrically connected to the second gate line GATE2; the third data line D3 is electrically connected to the source electrodes of the thin film transistors T5 and T6; the gate of the thin film transistor T5 is electrically connected to the first gate line GATE1; and the gate of the thin film transistor T6 is electrically connected to the second gate line GATE2.

Figure 12:
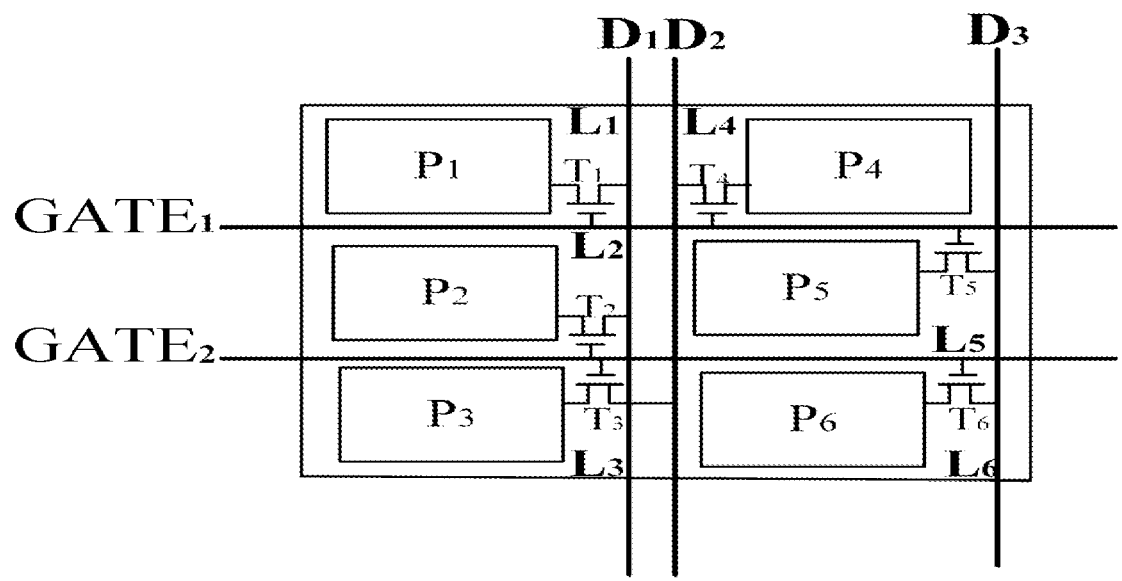
FIG. 12 is a schematic diagram of another dual-gate-driven lateral pixel arrangement structure according to an embodiment of the invention.

FIG. 12 shows another dual-gate-driven lateral pixel arrangement structure according to one embodiment of the invention, which is different from the embodiment shown in FIG. 2 in that: the first primary pixel region lies at the outside of the first data line, where said outside is the side of the first data line that is opposite to the second data line; the second primary pixel region lies between the second and third data lines. Specifically, the first data line D1 is electrically connected to the source electrodes of the thin film transistors T1 and T2; the gate of thin film transistor T1 is electrically connected to the first gate line GATE1; the gate of the thin film transistor T2 is electrically connected to the second gate line GATE2; the second data line D2 is electrically connected to the source electrodes of the thin film transistors T3 and T4; the gate of the thin film transistor T4 is electrically connected to the first gate line GATE1; the gate of the thin film transistor T3 is electrically connected to the second gate line GATE2; the third data line D3 is electrically connected to the source electrodes of the thin film transistors T5 and T6; the gate of the thin film transistor T5 is electrically connected to the first gate line GATE1; and the gate of the thin film transistor T6 is electrically connected to the second gate line GATE2.

Figure 13:
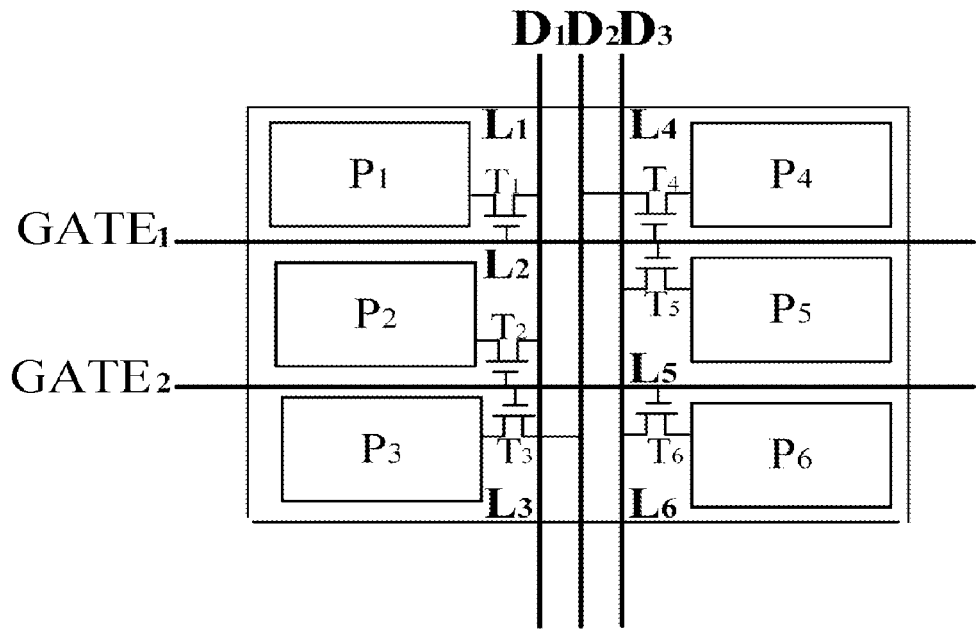
FIG. 13 is a schematic diagram of another dual-gate-driven lateral pixel arrangement structure according to an embodiment of the invention.

FIG. 13 shows another dual-gate-driven lateral pixel arrangement structure according to one embodiment of the invention, which is different from the embodiment shown in FIG. 2 in that: the first primary pixel region lies on the outside of the first data line, where said outside is the side of the first data line that is opposite to the second data line; the second primary pixel region lies on the outside of the third data line, where the outside of the third data line is the side of the third data line that is opposite to the second data line. Specifically, the first data line D1 is electrically connected to the source electrodes of the thin film transistors T1 and T2; the gate of thin film transistor T1 is electrically connected to the first gate line GATE1; the gate of the thin film transistor T2 is electrically connected to the second gate line GATE2; the second data line D2 is electrically connected to the source electrodes of the thin film transistors T3 and T4; the gate of the thin film transistor T4 is electrically connected to the first gate line GATE1; the gate of the thin film transistor T3 is electrically connected to the second gate line GATE2; the third data line D3 is electrically connected to the source electrodes of the thin film transistors T5 and T6; the gate of the thin film transistor T5 is electrically connected to the first gate line GATE1; and the gate of the thin film transistor T6 is electrically connected to the second gate line GATE2.

It should be noted that, in the dual-gate-driven lateral pixel arrangement structure provided in each of the above embodiments, the secondary pixel region may be rectangular shaped having the long sides parallel with the gate lines, and the short sides parallel with the data line. In other embodiments, the secondary pixel region may not be rectangular shaped.

The position variations of the gate lines, the data lines, the first primary pixel regions and the second primary pixel regions and the connection relation of the thin film transistors in the examples described above are for illustration only and not in any way limiting. One of ordinary skill in the art would recognize other variations, modifications, and alternatives.

The dual-gate-driven lateral pixel arrangement structure provided in each of the above embodiments of the invention may be such a dual-gate-driven lateral pixel arrangement structure, where each data line is electrically connected to the source electrodes of two thin film transistors, and the gates of two thin film transistors electrically connected to the same data line are electrically connected to different gate lines. With such a pixel structure, 2m gate lines and 3n/2 data lines are required for a screen with a resolution of m×n; thus, the driving time of each gate line is shortened to one-half of that of single-gate-driven lateral pixel arrangement mode in which a vertical screen is laterally utilized, so that a conventional TFT may also meet the driving requirements for a high resolution display, and thus is acceptable for extensive use. Moreover, the gate lines and the data lines required by the pixel structure according to embodiments of the invention are the same as those required by the existing dual-gate-driven vertical pixel arrangement mode, thus the number of the source driving chips and the number of the gate driving chips may remain unchanged, the driving time and the driving mode of each gate line may also remain unchanged, and the size of the display panel may also remain unchanged. Therefore, the dual-gate-driven lateral pixel arrangement structure according to embodiments of the invention may be manufactured by using the manufacturing processes of the existing dual-gate-driven vertical pixel arrangement structure.

Figure 14:
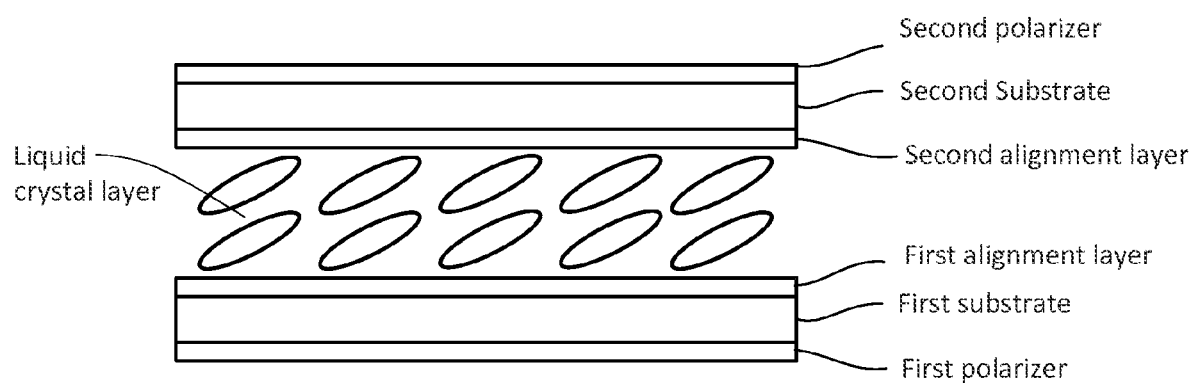
FIG. 14 is a schematic diagram of a display panel according to an embodiment of the invention.

Based on the above dual-gate-driven lateral pixel arrangement structure according to the invention, as shown in FIG. 14, a display panel is further provided, which includes a first substrate, a second substrate, and a liquid crystal layer disposed between the first and second substrates; where, the inventive dual-gate-driven lateral pixel arrangement structure may be provided repeatedly in a side-by-side manner on the first substrate. In an embodiment, the first substrate may be a TFT substrate, and the second substrate may be a Color filter (CF) substrate.

The dual-gate-driven lateral pixel arrangement structures and the display panels according to embodiments of the invention have been described in detail above. Specific examples are illustrated in the present specification to explain the principle and embodiments of the invention, and the above illustration of the embodiments is only used for understanding of the principle of the invention and the essential concept thereof. Those skilled in the art would recognize many modifications and alternatives of the embodiments and the application range based on the concept of the invention.

What is claimed is:

1. A dual-gate-driven lateral pixel arrangement structure, comprising:
   a first primary pixel region and a second primary pixel region, the first and second primary pixel regions arranged horizontally and adjacent to each other and having each three vertically adjacent secondary pixel regions, forming a grid of six secondary pixel regions arranged in three rows and two columns;
   six thin film transistors, each disposed in one of the six secondary pixel regions and having a source, a drain, and a gate;
   two gate lines extending horizontally; and
   three data lines extending vertically;
   wherein each data line is electrically connected to the source of two different thin film transistors, and the gates of the two different thin film transistors having the sources electrically connected to a same data line are electrically connected to the two gate lines, respectively.

2. The dual-gate-driven lateral pixel arrangement structure of claim 1, further comprising:
   a pixel electrode; and
   a common electrode line partially overlapped with the pixel electrode to form a storage capacitor, wherein the pixel electrode covers a light transmission region of a secondary pixel region.

3. The dual-gate-driven lateral pixel arrangement structure of claim 2, wherein the common electrode lines comprises:
   a first common electrode line and a second common electrode line that are disposed in parallel with the data lines; or
   a first common electrode line, a second common electrode line, and a third common electrode line that are disposed in parallel with the gate lines.

4. The dual-gate-driven lateral pixel arrangement structure of claim 1, wherein each of the secondary pixel regions has a rectangular shape having long sides parallel with the gate lines and short sides.

5. The dual-gate-driven lateral pixel arrangement structure of claim 4, wherein the two gate lines and the three data lines cross each other orthogonally and each of the gate lines and each of the data lines is electrically isolated from each other.

6. The dual-gate-driven lateral pixel arrangement structure of claim 4, further comprising:
   a pixel electrode; and
   a common electrode line partially overlapped with the pixel electrode to form a storage capacitor, wherein the pixel electrode covers a light transmission region of a secondary pixel region.

7. The dual-gate-driven lateral pixel arrangement structure of claim 4, wherein each of the two gate lines is arranged between two of the three vertically adjacent secondary pixel regions; or
   one of the two gate lines is arranged between two of the three vertically adjacent secondary pixel regions and the other one of the two gate lines is arranged along a side of the two horizontally adjacent primary pixel regions; or
   the two gate lines are arranged along opposite sides of the two horizontally adjacent primary pixel regions.

8. The dual-gate-driven lateral pixel arrangement structure of claim 7, wherein the two gate lines and the three data lines cross each other to form a first enclosed region and a second enclosed region, the first enclosed region comprising one secondary pixel region of the first primary pixel region and the second enclosed region comprising one secondary pixel region of the second primary pixel region; or
   the first enclosed region comprising two vertically adjacent secondary pixel regions of the first primary pixel region and the second enclosed region comprising two vertically adjacent secondary pixel regions of the second primary pixel region; or
   the first enclosed region comprising the three vertically adjacent secondary pixel regions of the first primary pixel region and the second enclosed region comprising the three vertically adjacent secondary pixel regions of the second primary pixel region.

9. The dual-gate-driven lateral pixel arrangement structure of claim 7, wherein the first primary pixel region is disposed between a first data line and a second data line of the three data lines.

10. The dual-gate-driven lateral pixel arrangement structure of claim 9, wherein the second primary pixel region is disposed between the second data line and a third data line of the three data lines.

11. The dual-gate-driven lateral pixel arrangement structure of claim 4, wherein the three data lines are parallel with the short sides of the secondary pixel regions and one, two, or all three data lines are arranged between the two adjacent primary pixel regions; or
   one of the three data lines is arranged between the two adjacent primary pixel regions and two of the three data lines are arranged at opposite sides of the two adjacent primary pixel regions; or two of the three data lines are arranged between the two adjacent primary pixel regions and one of the three data lines is arranged along an external side of the two adjacent primary pixel regions.

12. The dual-gate-driven lateral pixel arrangement structure of claim 11, wherein the two gate lines and the three data lines cross each other to form a first enclosed region and a second enclosed region, the first enclosed region comprising one secondary pixel region of the first primary pixel region and the second enclosed region comprising one secondary pixel region of the second primary pixel region; or the first enclosed region comprising two vertically adjacent secondary pixel regions of the first primary pixel region and the second enclosed region comprising two vertically adjacent secondary pixel regions of the second primary pixel region; or the first enclosed region comprising the three vertically adjacent secondary pixel regions of the first primary pixel region and the second enclosed region comprising the three vertically adjacent secondary pixel regions of the second primary pixel region.

13. The dual-gate-driven lateral pixel arrangement structure of claim 11, wherein the first primary pixel region is disposed between a first data line and a second data line of the three data lines.

14. The dual-gate-driven lateral pixel arrangement structure of claim 13, wherein the second primary pixel region is disposed between the second data line and a third data line of the three data lines.

15. A display panel comprising:
a first substrate;
a second substrate;
a plurality of pixel units arranged side-by side on the first substrate; and
a liquid crystal layer disposed between the first substrate and the second substrate; wherein each of the pixel units comprises a dual-gate-driven lateral pixel arrangement structure of claim 1.

16. The display panel of claim 15, wherein the first substrate is a thin film transistor substrate and the second substrate is a color filter substrate.

17. The display panel of claim 15, wherein the plurality of pixel units comprises m×n primary pixel regions driven by 2m gate lines and 3n/2 data lines, m and n being integers.

18. The display panel of claim 17, wherein the gates lines and the data lines cross each other orthogonally, and the gate lines and the data lines are electrically isolated from each other.

19. A method for driving a dual-gate-driven lateral pixel arrangement structure having two horizontally adjacent primary pixel regions having each three vertically adjacent secondary pixel regions for forming six secondary pixel regions, six thin film transistors each disposed in one of the six secondary pixel regions, a first gate line and a second gate line both extending horizontally, and three data lines extending vertically, wherein each data line is connected to a source of two thin film transistors and the gates of the two thin film transistors having the sources electrically connected to a same data line are connected to the two gate lines respectively, the method comprising:

at a first time point, driving the first gate line at a high level and the second gate line of the two gate lines at a low level to turn on a first thin film transistor electrically connected to the first gate line, and providing first appropriate signal levels to the three data lines; and at a second time point, driving the second gate line at a high level and the first gate line at a low level lines to turn on a second thin film transistor electrically connected to the second gate line, and providing second appropriate signal levels to the three data lines.

20. The method of claim 19, wherein the first gate line is driven at the high level for a first time period, the second gate line is driven at the low level for a second time period, the first appropriate signal levels to the three data lines are provided for a third time period, the second gate line is driven at the high level for a fourth time period, the first gate is driven at the low level for the fifth time period, and the second appropriate signal levels to the three data lines are provided for a sixth time period, wherein the first, second, third, fourth, fifth, and sixth time periods are substantially equal.

* * * * *